(12) United States Patent
Pohl et al.

(10) Patent No.: US 10,845,879 B2
(45) Date of Patent: Nov. 24, 2020

(54) DEFORMABLE OBJECTS FOR HAPTIC FEEDBACK

(71) Applicant: Intel IP Corporation, Santa Clara, CA (US)

(72) Inventors: Daniel Pohl, Puchheim (DE); Roman Schick, Krailling (DE)

(73) Assignee: Intel IP Corporation, Santa Clara, CA (US)

(*) Notice: Subject to any disclaimer, the term of this patent is extended or adjusted under 35 U.S.C. 154(b) by 76 days.

(21) Appl. No.: 15/969,581

(22) Filed: May 2, 2018

(65) Prior Publication Data
US 2019/0041988 A1   Feb. 7, 2019

(51) Int. Cl.
*G06F 3/01* (2006.01)
*G06F 3/03* (2006.01)

(52) U.S. Cl.
CPC .......... *G06F 3/016* (2013.01); *G06F 3/011* (2013.01); *G06F 3/0304* (2013.01)

(58) Field of Classification Search
None
See application file for complete search history.

(56) References Cited

U.S. PATENT DOCUMENTS

| | | | | |
|---|---|---|---|---|
| 7,245,292 B1* | 7/2007 | Custy | ............. | G06F 3/011 178/18.01 |
| 9,102,055 B1* | 8/2015 | Konolige | ............. | B25J 9/163 |
| 9,836,117 B2* | 12/2017 | Shapira | ............. | G06F 3/011 |
| 2006/0097683 A1* | 5/2006 | Hosoda | ............. | B25J 5/007 318/568.12 |
| 2009/0231287 A1* | 9/2009 | Rogowitz | ............. | G06F 3/016 345/173 |
| 2012/0307590 A1 | 12/2012 | Faruque | | |
| 2016/0054837 A1* | 2/2016 | Stafford | ............. | G06F 3/012 463/33 |
| 2017/0106738 A1* | 4/2017 | Gillett | ............. | G05D 1/0016 |
| 2017/0242485 A1* | 8/2017 | Squair | ............. | G06F 3/016 |
| 2018/0050256 A1* | 2/2018 | Buvid | ............. | A63B 71/0622 |
| 2018/0067543 A1* | 3/2018 | Sinclair | ............. | G06F 3/011 |
| 2018/0157317 A1* | 6/2018 | Richter | ............. | G06F 3/011 |
| 2019/0279284 A1* | 9/2019 | Sunday | ............. | G06F 1/163 |
| 2019/0332122 A1* | 10/2019 | Eder | ............. | G05D 1/0265 |

OTHER PUBLICATIONS

Cheng et al.; "TurkDeck: Physical Virtual Reality Based on People"; In: User Interface Software and Technology (UIST '15); (Nov. 8-11, 2015); pp. 417-426; Charlotte, NC, USA; <doi: 10.1145/2807442.2807467>.

(Continued)

*Primary Examiner* — Kent W Chang
*Assistant Examiner* — Benjamin Morales
(74) *Attorney, Agent, or Firm* — Hanley, Flight and Zimmerman, LLC

(57) ABSTRACT

Components, devices, systems, and methods for providing passive haptic feedback for a user interacting with a virtual reality simulation. A physical object with a surface may represents an object in the virtual reality simulation. A mechanism may be configured to change a shape or size of the surface of the physical object in response to a change in the virtual reality simulation.

27 Claims, 8 Drawing Sheets

(56) References Cited

OTHER PUBLICATIONS

Feltham; "Gabe Newell Teases 'House-Scale' VR, Three 'Full' Valve VR Games"; Upload VR; (Feb. 10, 2017); 6 pages; [retrieved on Aug. 2, 2018]; Retrieved from <URL: https://uploadvr.com/gable-newell-teases-house-scale-vr-three-full-games-works/>.

Insko et al.; "Passive Haptics Significantly Enhances Virtual Environments"; University of North Carolina at Chapel Hill; (2001); 5 pages.

Insko; "Passive Haptics Significantly Enhances virtual Environments"; University of North Carolina at Chapel Hill; (2001); 111 pages.

Sra et al.; "Procedurally Generated Virtual Reality from 3D Reconstructed Physical Space"; In: Virtual Reality Software and Technology (VRST '16); (Nov. 2-4, 2016); pp. 191-200; Garching bei München, Germany; <doi: 10.1145/2993369.2993372 >.

The VOID LLC; "The VOID"; The VOID—Step Beyond Reality; [website]; (2016); [retrieved Aug. 14, 2018]; 9 pages; Retrieved from the internet: <URL: https://www.thevoid.com/>.

\* cited by examiner

DEFORMABLE OBJECTS FOR HAPTIC FEEDBACK

BACKGROUND

The demand for virtual reality (VR) devices and systems has been increasing in recent years. VR may refer to computer technologies that generate realistic images, sounds and other sensations to create an environment. The environment may be three dimensional and immersive and may simulate a user's physical presence in this environment. A user may be enabled to interact with the virtual space and objects in the environment using display screens or projectors and other devices. VR devices provide a unique user experience and may be used in any number of settings such as a user's living room or bedroom or in a public setting. VR devices have limitations when it comes to a user interacting with a physical object that is represented in a virtual reality simulation.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

DESCRIPTION OF EMBODIMENTS

Figure 1A:
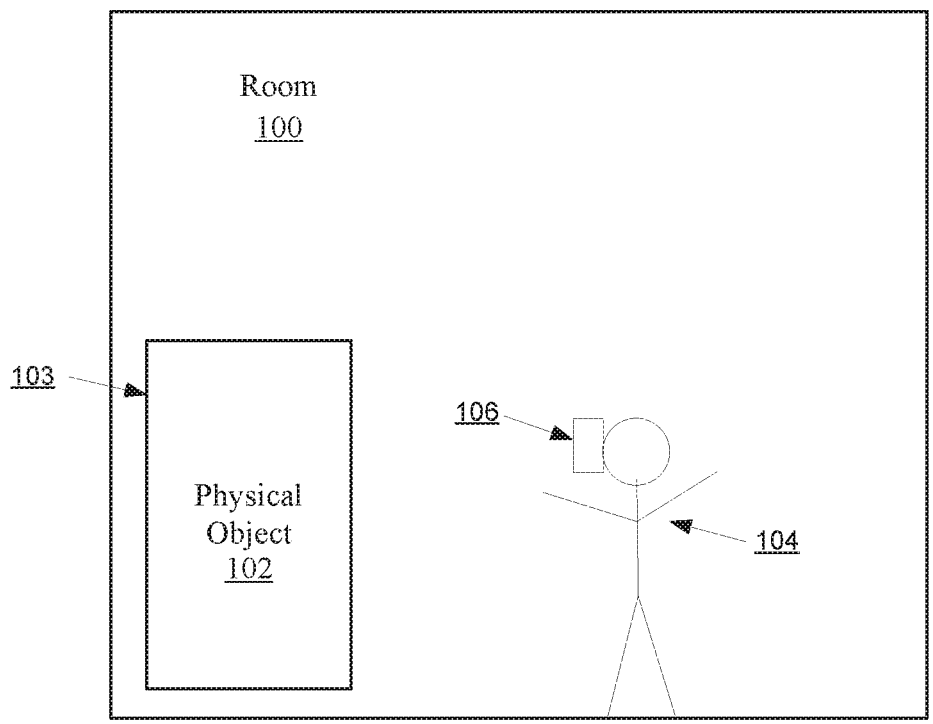
FIGS. 1A-1C are block diagrams of deformable physical objects for passive haptic feedback in accordance with an example embodiment.

Before invention embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to convey a thorough understanding of various invention embodiments. One skilled in the relevant art will recognize, however, that such detailed embodiments do not limit the overall inventive concepts articulated herein, but are merely representative thereof.

As used in this written description, the singular forms "a," "an" and "the" include express support for plural referents unless the context clearly dictates otherwise. Thus, for example, reference to "an integrated circuit" includes a plurality of such integrated circuits.

Reference throughout this specification to "an example" means that a particular feature, structure, or characteristic described in connection with the example is included in at least one invention embodiment. Thus, appearances of the phrases "in an example" or "in an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various invention embodiments and examples can be referred to herein along with alternatives for the various components thereof. It is understood that such embodiments, examples, and alternatives are not to be construed as de facto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of invention embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in this written description, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The term "coupled," as used herein, is defined as directly or indirectly connected in an electrical or nonelectrical manner. "Directly coupled" objects or elements are in physical contact with one another. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device, which is more likely to have write errors to it than other regions in the same memory device. A number of factors can cause such increased risk, including location, fabrication process, number of program pulses applied to the region, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases, depend on the specific context. However, generally speaking, the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood, that such a range format is used merely for convenience and brevity, and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, transitory or non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "processor" can include general purpose processors, specialized processors such as VLSI, FPGAs, or other types of specialized processors, as well as base band processors used in transceivers to send, receive, and process wireless communications.

It should be understood that many of the functional units described in this specification may have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Virtual reality simulations seek to provide a user with an immersive experience that may simulate experience from the real world. Hardware and other technology are employed to provide feedback or stimuli to a user's senses. For example, a head-mounted display may be a wearable object that a user wears on the head and over the eyes. The head-mounted display may have a screen that displays images to the user. Headphones or other speakers may also be employed to provide audio feedback to the user. Other senses such as taste, smell, and touch have been difficult to simulate. The present technology provides a deformable and movable physical object to provide haptic feedback to user to provide touch feedback to user during the use of a virtual reality simulation.

Virtual reality simulation may include different scales or categories of immersion. Different scales may include seated virtual reality, room scale virtual reality, house scale virtual reality, warehouse virtual reality, and world scale virtual reality. For example, seated virtual reality may be where a user employs a head-mounted display while in a seated position and the user does not move from the seated position. Room scale virtual reality may be where a user employs hardware such as a head-mounted display and is located in a room. The user is free to move about the room and interact with objects within the room.

Once a user is no longer seated, such as in scales including room, house, or warehouse virtual reality, most objects located within the environment are static relative to the virtual reality simulation and the objects do not interact with the virtual reality simulation. The present technology provides deformable and movable physical objects that provide haptic feedback to the user and can deform or move as changes are made within the virtual reality simulation. For example, in room scale virtual reality, the room may have an object such as a wall that is represented physically in the room as well as virtually within the simulation. As the user moves within the virtual reality simulation, the shape, height, size or placement of the wall may move. The present technology has the ability to move and deform the wall, or other physical object, in the real world as the virtual object changes in the virtual reality simulation. The present technology may be employed with any scale of virtual reality including room scale virtual reality, house scale virtual reality, warehouse virtual reality, and world scale virtual reality.

In one aspect, the physical objects of the present technology may move or deform automatically when changes are made in the virtual reality without requiring a person to physically move or deform the physical object. The physical object may incorporate mechanisms such as robotics to change shapes or move. The present technology may comprise a tracking system that tracks the changes with the virtual reality simulation. This tracking data is then used to move or deform the physical object. The physical object may employ a location system and a mobility system that capable of knowing where the physical object is located with a room and then move to a second location within the room on command. For example, the mobility system may be steerable wheels that are driven by a motor. The physical object may be any shape or size and may deform or change into any shape or size. For example, the physical object may be a box, a cylinder, a torus, etc. The physical object may be used to represent a wall, furniture, stairs, vehicles, trees, plants, buttons, doors, and other objects within the virtual reality simulation. The physical object may be touched by the user thus providing haptic feedback to the user during the virtual reality simulation. The feedback may be passive haptic feedback while the physical object is stationary.

In one aspect, a plurality of physical objects may protrude from the surface of a housing to create a deformable surface. For example, the protruding objects may be small in size such as cylinders that are smaller than a human fingertip. The protruding objects may protrude at different lengths from the surface of the housing. Each of the protruding objects may be controlled by an individual mechanism. This may allow various types of surfaces to be created. The protruding objects may form a specific texture that mimics a texture that a user may encounter in the real work. For example, the protruding objects may generate a surface that mimics a brick wall where indentations are formed where mortar joints would be located in between individual bricks. Thus when a user touches the deformable surface that mimics a brick wall, the deformable surface may feel like a brick wall. The virtual reality simulation may then simultaneously display a brick wall to the user. The deformable surface may be used in conjunction with a movable object so that a physical object may move about a room automatically in conjunction with changes made to the virtual reality simulation and the surface of the physical object may deform according to the changes.

Such a deformable surface may also be employed to interact or control the virtual reality simulation. For example, the deformable surface may be employed to form a user interface. The user interface may be made up of buttons or other shapes. The button may be a round shape that protrudes further from the housing than the other protruding objects surrounding the button. The button may be depressed by a user causing the button to recess further into the housing. Sensors associated with the protruding objects may be used to sense when the button has been depressed. Once the button has been depressed, feedback may be provided to the virtual reality simulation to control actions within the virtual reality simulation. For example, a physical door in the physical room may have a deformable surface next to the door. The deformable surface may form a plurality of physical buttons. The plurality of physical buttons may be represented in the virtual reality simulation as a keypad that has labels on each of the buttons while the physical buttons may have no labels. If the correct series of buttons is pushed by the user, then the door may be unlocked and opened.

In one aspect, more than one room may be used in conjunction with the present technology where the positions of the rooms relative to one another are automatically arraigned. The rooms may be moved relative to one another while a user is located within one of the rooms during a virtual reality simulation. The rooms may be moved based on changes made within the virtual reality simulation. For example, the present technology may comprise two rooms that a user may employ for a virtual reality simulation. Each of the two rooms may have four walls with a passageway in each of the walls. The first passageway of the first room may be aligned with a passageway into the second room. However, during the use of the virtual reality simulation, the user located in the first room may be about to use the second passageway of the first room to pass into another room. Before the user passes through the second passageway of the first room, the two rooms may be arraigned and moved so that the second passageway of the first room is aligned with a passageway of the second room. The virtual reality simulation may prevent the user from using the second passageway until the second room is aligned with the second passageway of the first room. The rooms may be placed on tracks and use motors or other means of conveyance to move on the tracks to properly align with one another.

FIG. 1A is a block diagram illustrating a room 100 of a physical object 102 with a size and a location 103 in accordance with embodiments of the present technology. The room 100 may be a location that is used specifically for virtual reality simulations. For example, the room 100 may be at a location where users go to rent rooms such as the room 100 to play virtual reality games. A user 104 is also depicted in the room wearing a wearable object 106. More than one user may be located in the room 100. The wearable object 106 may be hardware or other technology that is employed by the user to participate in a virtual reality simulation. The wearable object 106 may be a head-mounted display. The wearable object 106 may display images to the user 104 and may produce audible sounds for the user 104. The images and sounds may be to stimulate or provide feedback to the user 104 corresponding to what is occurring in the virtual reality simulation. The physical object 102 also provides touch feedback to the user 104 corresponding to a virtual object in the virtual reality simulation. This may be described as passive haptic feedback for a stationary object. The physical object 102 may represent a virtual object such as a wall, furniture, stairs, rocks, vehicles, trees, plants, doors, and other objects within the virtual reality simulation. The room 100 may include more than one physical object similar to or different from the physical object 102. The present technology, including the physical object 102, may be described as passive haptic feedback and may be used as substantially the only type of haptic feedback, or in some embodiments, can be used in conjunction with active haptic systems. For example, an active haptic system may be a wearable device such as a virtual reality glove. The virtual reality glove may have a plurality of motors that are used to simulate sensations such as a rain so that if it is raining in the virtual reality simulation, the virtual reality glove can provide feedback to the user to simulate the feel of rain on the user's hand and arm. In one aspect, the wearable object 106 may be an active haptic system.

Figure 1B:
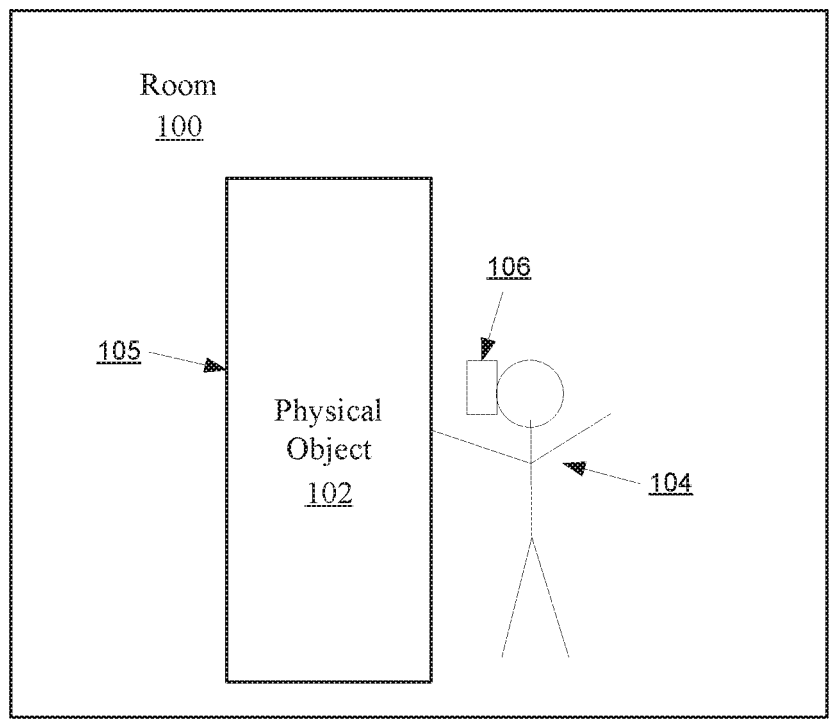

As the user 104 or other users interact with the virtual reality simulation, changes are made within the virtual reality simulation. For example, the users may move to different virtual locations or may build virtual objects within the virtual reality simulation. The virtual reality simulation may also changes without any input from the user. The changes in the virtual reality simulation may be tracked and used to automatically change the physical position and/or size or shape of the physical object 102 in the room 100. For example, FIG. 1A depicts the physical object 102 at location 103 in the room 100. In FIG. 1B the physical object 102 has moved to location 105 which is closer to the user 104 and the physical object 102 has increased in height in FIG. 1B relative to FIG. 1A. The change in location and height of the physical object 102 may occur automatically using the present technology without requiring a user, such as an administrator of the virtual reality simulation, to manually move or change the physical object 102. The physical object 102 may be described as a robot.

Figure 1C:
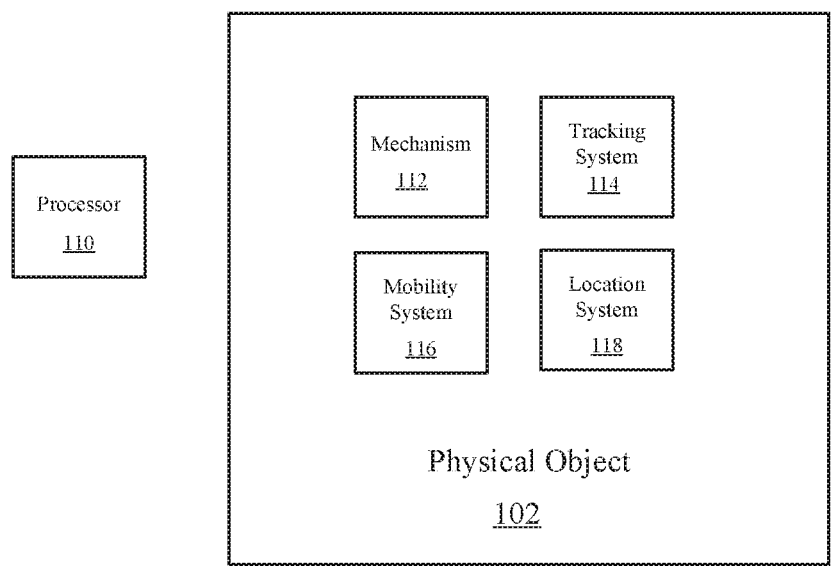

FIG. 1C is a block diagram illustrating the physical object 102 with various components in accordance with embodiments of the present technology. The physical object 102 may include a mechanism 112 for changing the height, size, or shape of the physical object 102. The mechanism 112 may be one mechanisms or plurality of mechanisms. The mechanism 112 may be mechanical, hydraulic, robot, electrical, or any other means for physically moving and shaping objects. For example, the mechanism 112 may be an electric motor coupled with a hydraulic system that can cause a portion of the physical object 102 to protrude out of a surface of the physical object 102. The mechanism 112 may telescope or retract portions of the physical object 102 relation to other portions of the physical object 102. The mechanism 112 may be employed to fold or unfold portions of the physical object 102 using hinges. The mechanism 112 may be controlled by a processor and other computer components built in or otherwise associated with the mechanism 112. The mechanism 112 may be capable of receiving wireless signals that can command the mechanism 112 to operate. The mechanism 112 may receive commands from a tracking system 114.

The tracking system 114 may be composed of computer components such as a processor, memory, and input/output components such as wireless communication devices. The tracking system 114 may track changes that are made to the virtual reality simulation. The tracking may occur using one or more techniques. The tracking system 114 receive data from a processor 110 associated with the virtual reality simulation. The data may be received wirelessly. The processor 110 may be associated with the wearable object 106 or may be associated with a hardware device such a consul system located in or near the room 100. The consul system may be designed to execute a shared virtual reality simulation for multiple users. The processor 110 may also execute the virtual reality simulation in conjunction with other computing systems over a network. Cloud computing and the interne may be employed to execute the virtual reality simulation. The data received from the processor 110 at the tracking system 114 may be commands from the processor 110 to move or change the physical object 102. The data from the processor 110 may be analyzed by the tracking system 114 to make determinations about where and how the physical object 102 should be moved or changed. In one aspect, the wearable object 106 may be a head-mounted display that has cameras that generate data regarding the physical environment surrounding the user 104 meaning the room 100. The data from the cameras may be sent to the tracking system 114 for analyzing.

A mobility system 116 may be employed to move the physical object 102 to a new location. The mobility system 116 may include motorized wheels, tracks, conveyer belts, or other means for moving the physical object 102 within the room 100. The mobility system 116 in conjunction with the tracking system 114 and a location system 118 may include collision avoidance technology. For example, the collision avoidance technology may use data from the cameras associated with the wearable object 106 to determine where objects are located within the room 100 including where the user 104 is located. Mobility system 116 may steer the physical object 102 around other objects located with the room include other objects that may be moving. A processor may be employed to calculate a path that is to be taken by the physical object 102. In one aspect, the physical object 102 includes cameras and other sensors to provide data to the mobility system 116 and the location system 118 to determine the next position for the mobility system 116 and to avoid collisions while the physical object 102 is moving. In one aspect, the room 100 includes cameras or other sensors mounted to the permanent walls of the room 100. The cameras and other sensors associated with the room 100 may send data to the systems of the physical object 102 to avoid collisions while the physical object 102 is moving.

The location system 118 is capable of determining a location of the physical object 102 within the room 100 and to locate position the physical object 102 is to move to. This may be accomplished using a variety of technologies. In one aspect, the location system 118 uses global positioning satellite technology for determining the location. The location system 118 may also triangulate a location of the physical object 102 using wireless signals. For example, three different wireless routers associated with the room 100 may broadcast signals that the location system 118 can use to determine location. The location system 118 may also employ data from camera and sensor located within the room to determine location. In one aspect, the location system 118 employs optical tracking devices on the physical object 102 to determine a location. The room 100 may be labeled with optical markers or other type of markers to indicate different positions within in the room 100. Such markers may be known to the virtual reality simulation and thus may be used to position the physical object 102 to represent a virtual object within the virtual reality simulation.

Figure 2A:
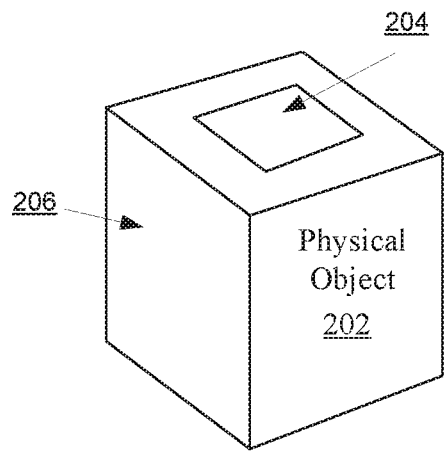
FIGS. 2A-2D are block diagrams of deformable physical objects with telescoping and hinging features in accordance with an example embodiment.
Figure 2B:
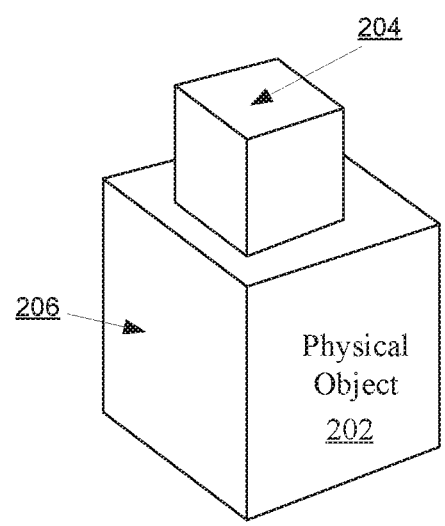

FIGS. 2A-D are block diagrams illustrating a physical object 202. The physical object 202 may have all the same capabilities and features of the physical object 102 of FIGS. 1A-C. In FIG. 2A the physical object 202 is depicted with an outer housing 206 and an inner portion 204. The inner portion 204 is depicted as being retracted into the outer housing 206. In FIG. 2B the outer housing 206 is depicted as protruded from the upper surface of the outer housing 206. In this manner the physical object 202 can change shape and height. The inner portion 204 protruding from the outer housing 206 may described as a telescoping protrusion. The inner portion 204 may be extended using motors and hydraulics or other means. The inner portion 204 may include an additional inner portion that may also telescopically protrude from a surface from the inner portion 204. Any number of telescoping portions may be used for the physical object 202.

Figure 2C:
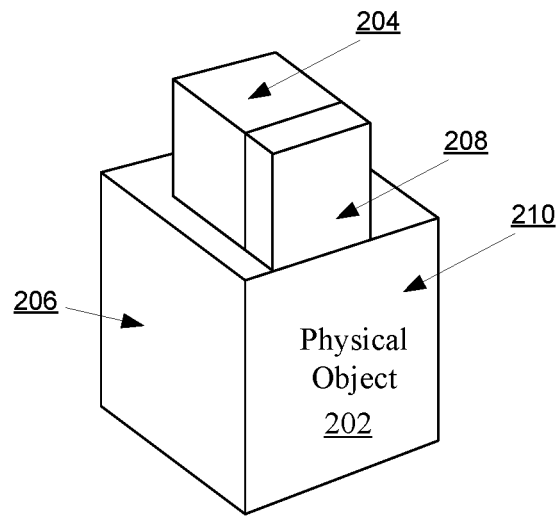

The inner portion 204 is necessarily smaller than the outer housing 206 so that the inner portion 204 can retract into the outer housing 206. The telescopic nature that is depicted for physical object 202 shows how there is a distance between the surfaces of the outer housing 206 and the inner portion 204 when the inner portion 204 is protruding. Thus a user that touches the outer housing 206 and then the inner portion 204 will notice that the surfaces are different distances from the user. This becomes increasingly noticeable when the physical object 202 has multiple telescoping portions. If the physical object 202 is to represent a wall in the virtual reality simulations, the differences in distance between the outer housing 206 and the inner portion 204 are problematic. FIG. 2C depicts a technique for extending a portion 208 of the inner portion 204 to be flush with a surface 210 of the outer housing 206. Extending the portion 208 may be accomplished using various techniques. The portion 208 may be a part of the inner portion 204 that is designed to separate from the main body of the inner portion 204 and extend using mechanical mechanisms such as motors and hydraulics. In one example, the portion 208 is made up of many smaller objects that are recessed into the inner portion 204. After the inner portion 204 is protruded from the outer housing 206, mechanisms are employed to extend the smaller objects from a surface of the outer housing 206. Extending the portion 208 to be uniform with the surface 210 of the outer housing 206 provides tactile feedback to the user of a uniform surface between the surface of the portion 208 and the surface 210. However, the inner portion 204 is narrower than the outer housing 206 from side to side.

Figure 2D:
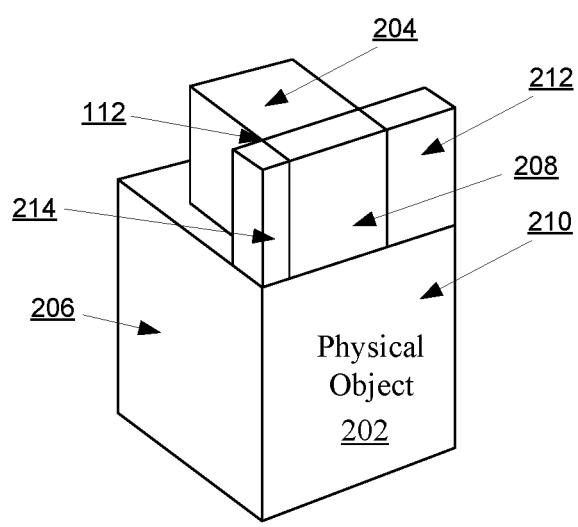

FIG. 2D depicts a solution for extending portion 208 from side to side to match the width of the outer housing 206. A portion 212 and 214 may be unfolded from the inner portion 204 to provide a uniform surface matching the width of the outer housing 206. The portions 212 and 214 may be attached to the inner portion 204 or the portion 208 using hinges and may be unfolded using mechanical means. Thus the physical object 202 may represent a wall that may change in height and by telescoping portions and unfolding portions. The techniques maybe reversed to decrease the height of the wall. A physical object may employ both telescoping techniques or unfolding techniques or both to change shape or height.

Figure 3:
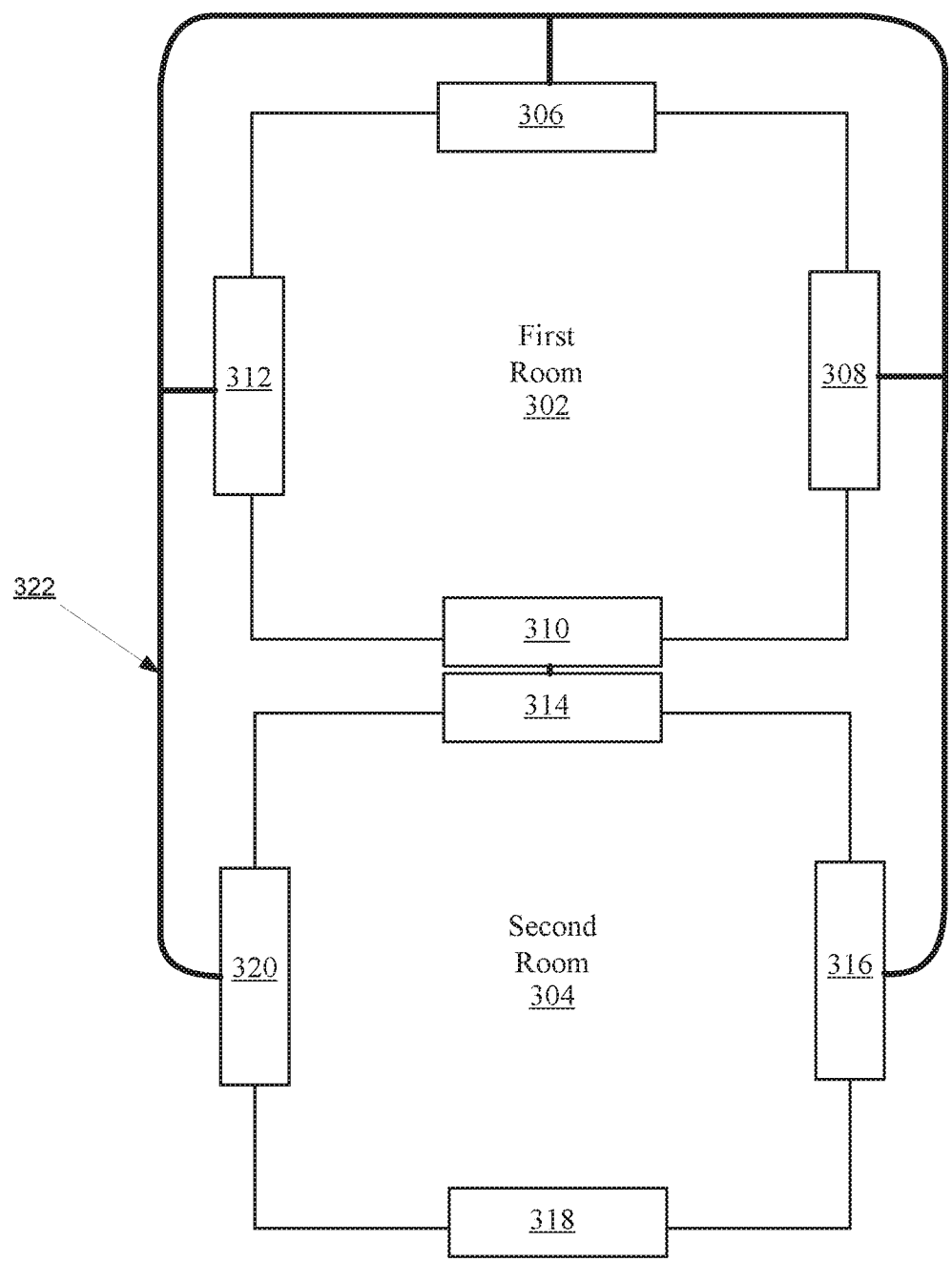
FIG. 3 is a block diagram of automatic room arraignment in accordance with an example embodiment.

FIG. 3 depicts a block diagram of automatic room setup in accordance with the present technology. FIG. 3 depicts a top view of first room 302 and second room 304 which may have all of the same features of the room 100 of FIGS. 1A-C. The first room 302 and second room 304 may be designed to house users that are participating in a virtual reality simulation. The first room 302 includes passageways 306, 308, 310, and 312 and the second room 304 includes passageways 314, 316, 318, and 320. The users may be able to pass from the first room 302 to the second room 304. However, the users may be able to pass from the first room 302 to the second room 304 when a passageway of the first room 302 aligns with a passageway of the second room 304. If the user attempts to pass through a passageway of the first room 302, such as passageway 312 that is not aligned with a passageway of the second room 304, then the user will not enter the second room 304. This may disrupt the flow of the virtual reality simulation. The present technology may employ locking mechanisms that lock the doors to passageways. The locking mechanisms may be controlled by the virtual reality simulation. The virtual reality simulation in conjunction with the present technology may only unlock a passageway if the passageway is aligned with the passageway to another room. In one aspect, the locking mechanism may only be unlocked if the user passes an achievement in the current room.

A track 322 may be employed to move or shift the first room 302 or the second room 304 to properly align passageways between the room according to changes or actions that are taken in the virtual reality simulation. For example, the passageway 312 is depicted as aligning with the passageway 314. However, a user in the first room 302 may be attempting to pass through passageway 308 to enter another room according to what is taking place in the in virtual reality simulation. The attempt by the user may be detected by gestures the user makes, the location of the user within the first room 302, or input made by the user via hardware button wearable by the user or hardware buttons associated with the room or passageways. The present technology may also track the actions in the virtual reality simulation to anticipate when a user is about the pass through a given passageway. Before the user is allowed to pass through the passageway 308, the second room 304 must be aligned with the passageway 308. The virtual reality simulation may dictate that a specific passageway of the second room 304 be aligned with the passageway 308 or any passageway of the second room 304 may be acceptable. Time may be required for the second room 304 to move along the track 322 to get into position. During this time, the passageway 308 may remain locked. After the second room 304 is aligned with the passageway 308 the passageway 308 may be unlocked and the user is allowed to pass into the second room 304. The user may be alerted to the passageway unlocking using audible or visual signals. A passageway may also not be unlocked until the physical objects within the next room have been positioned according to locations dictated by the virtual reality simulation. A locked passageway may be represented in the virtual reality simulation as a blocked passageway. For example, a blocked passageway may be represented by a virtual boulder in front of the passageway. When the room is unlocked then the virtual boulder may roll away from the passageway.

In one aspect, a room that a user is located in may not be moved so that the user does not detect physical movement of the room. Alternatively, a room may be moved slowly so that a user in the room does not detect movement. In one example, a room may be moved at a rate of 0.5 meters per a second. FIG. 3 depicts two rooms on the tracks 322 however, any number of rooms may be used in accordance with the present technology and the tracks 322 may be formed in any number of shapes. In one example, the tracks 322 are not employed but other means for moving the rooms may be employed. The rooms may be located on wheels or may spin on pivot points.

In one aspect, the first room 302 or the second room 304 may contain a physical object that may be moved or changed in shape according to changes in the virtual reality simulation such as is described in FIGS. 1A-C and FIGS. 2A-D. The physical object may be formed into stairs in front of a passageway. For example, stairs may be formed in front of passageway 310 in the first room 302. The second room 304 may then be elevated using hydraulics or other mechanisms. The user in the first room 302 may then use the stairs to walk into the second room 304 that has been elevated relative to the first room 302. The second room 304 may then be lowered to be the same in elevation relative to the first room 302.

Figure 4A:
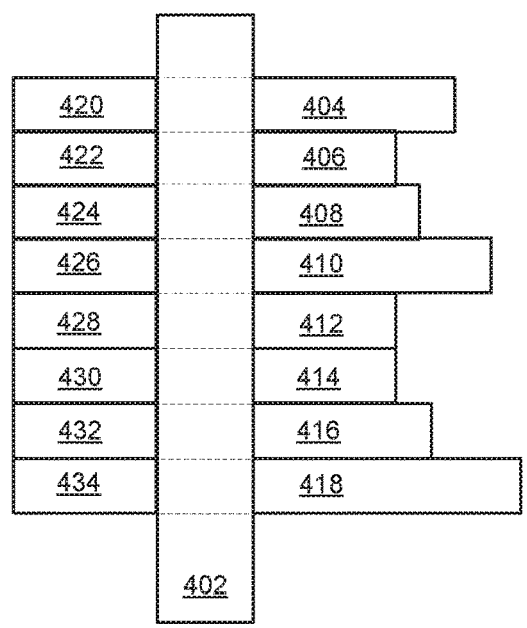
FIGS. 4A and 4B are block diagrams of physical objects with mechanisms that form a deformable surface for haptic feedback in accordance with an example embodiment.

FIG. 4A depicts a side view of a deformable surface in accordance with embodiments of the present technology. The deformable surface is depicted as being formed of a plurality of protruding objects. FIG. 4A depicts protruding objects 404, 406, 408, 410, 412, 414, 416, and 418. The protruding objects are depicted as protruding from a surface of a housing 402. The housing 402 may be part of another object or device. For example, the housing 402 may be located on or within a wall of a room such as room 100 of FIG. 1A or the first room 302 or the second room 304 of FIG. 3. The housing 402 may also be part of a physical object such as is described in FIGS. 1A-C and FIGS. 2A-D. The protruding objects may be composed of any type of material including plastic or metal.

The protruding objects 404, 406, 408, 410, 412, 414, 416, and 418 may protrude at a distance from the housing 402 that is different from one another. For example, the protruding object 418 protrudes the longest while the protruding objects 412 and 414 protrude the same distance as one another and protrude the shortest distance. The distance of the protrusion may be controlled by a mechanism for each of the protruding objects. FIG. 4A depicts the mechanisms 420, 422, 424, 426, 428, 430, 432, and 434 corresponding respectively to the protruding objects 404, 406, 408, 410, 412, 414, 416, and 418. Each mechanism is able to extend or retract the protruding object from the surface of the housing 402. The mechanisms may be electromagnetically controlled. The ends on the right side of the protruding objects form a deformable surface.

Figure 4B:
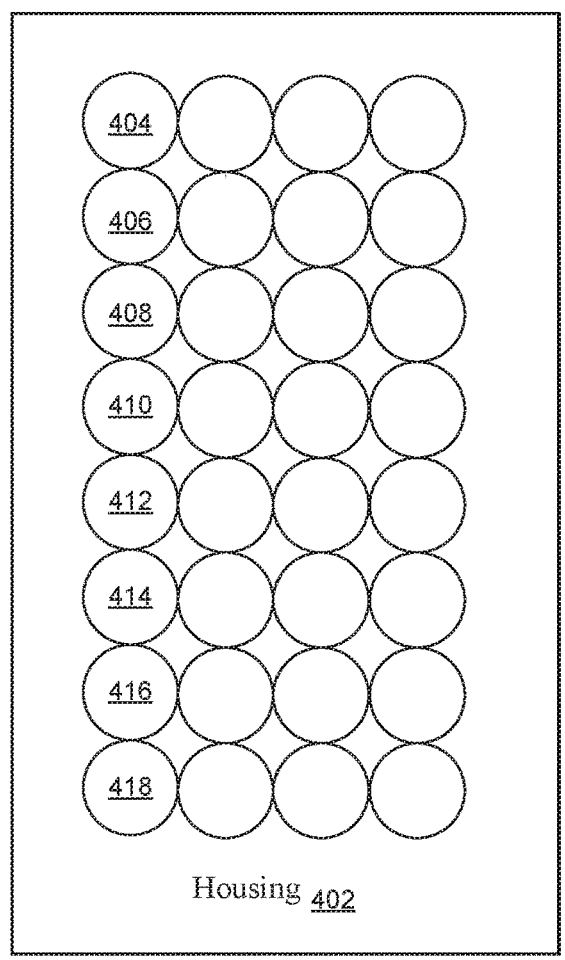

The protruding objects may be cylindrical in shape as is depicted in FIG. 4B. The diameter of the cylinders may be any diameter. In one aspect, the diameter of the cylinder is smaller than a human fingertip. The smaller the diameter than the finer the detail is that can be created. The cylinders may also be described as pins. The mechanisms may control the distances of the protrusions such that the deformable surface may be uniform and feel smooth to a user. The deformable surface may also be controlled to form a pattern that may be recognizable upon touch by the user. For example, the deformable surface may represent brick wall and so the protruding objects are formed into bricks with recesses where the mortar is located between the bricks. Other patterns and textured may be formed.

A plurality of the protruding objects may be formed into a button. For example, a portion of the plurality may be controlled by the mechanisms to protrude further than the surrounding protruding objects. The button may form a shape such as a circle or a square or any other shape. The user may interact with the button as a physical button and thus receive haptic feedback by depressing the button. The protruding objects may have dampening, springing actions, or cushioning that is controlled by the mechanisms. The act of depressing the button may be tracked and data corresponding to the button depression may be sent to the virtual reality simulation. Each protruding object may have an associated sensor, such as a pressure sensor, to detect when a protruding object has been depressed. Thus actions taken in the physical world may cause changings in the virtual reality simulation. For example, the button may be formed in the housing 402 next to a passageway in a room. The button may not be labeled in the real world, but in the virtual reality simulation the button may be labeled with words, pictures or symbols. The button may be represented in the virtual reality simulation as a doorbell. Thus the user may recognize that if the button is pressed a bell may virtually ring on the other side of the passageway.

The protruding objects may also form a plurality of buttons or other controls that may form a user interface in the virtual reality simulation. The buttons may be of different shapes and sizes and may not be labeled in the real world but may be labeled in the virtual reality simulation. Thus the user may control the virtual reality simulation via the interface that is created in both the real world and the virtual reality simulation. The dampening, springing actions, or cushioning of the protruding objects may be used to represent other features or objects in the virtual reality simulation. For example, if the housing 402 is placed in the floor of the room the protruding objects may be used to represent different types of flooring such as carpet or grass and may have corresponding dampening and springing action.

In one embodiment, a deformable surface as depicted in FIGS. 4A and B may be formed on the surface of the inner portion 204 of FIG. 2C such that the surface of the inner portion 204 may be extended to match the surface of the outer housing 206.

FIG. 4B depicts a front view of the deformable surface of FIG. 4A. The protruding objects 404, 406, 408, 410, 412, 414, 416, and 418 are depicted as cylinders. It should be appreciated that that any shape can but used for the protruding objects. FIG. 4B depicts an additional twenty four protruding objects for a total of thirty two protruding objects. It should be appreciated that any number of protruding objects may be used in conjunction with the present technology.

Figure 5:
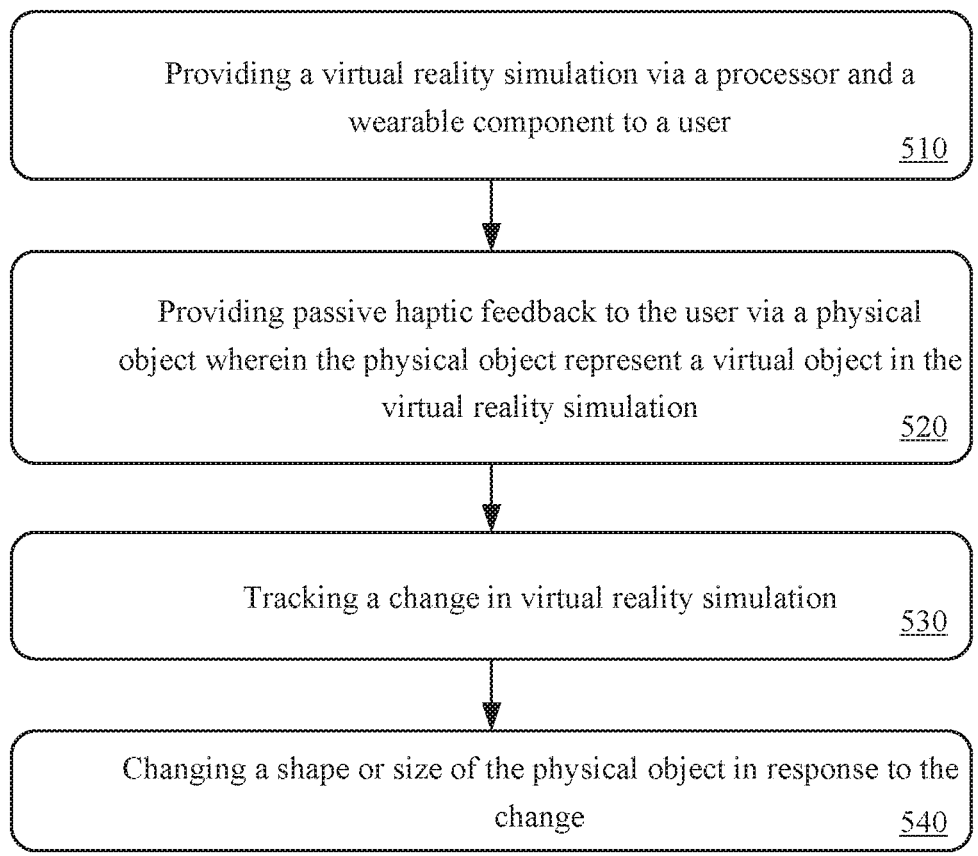
FIG. 5 is a flow diagram of a method for providing haptic feedback in accordance with an example embodiment.

FIG. 5 illustrates a flow diagram of methods or operations for providing haptic feedback in accordance with embodiments of the present technology. For example, starting in block 510 a virtual reality simulation is provided via a processor and a wearable component to a user. Passive haptic feedback is provided to the user via a physical object wherein the physical object represents a virtual object in the virtual reality simulation, as in block 520. A change in virtual reality simulation is tracked, as in block 530. A shape or size of the physical object is changed in response to the change, as in block 540.

Figure 6:
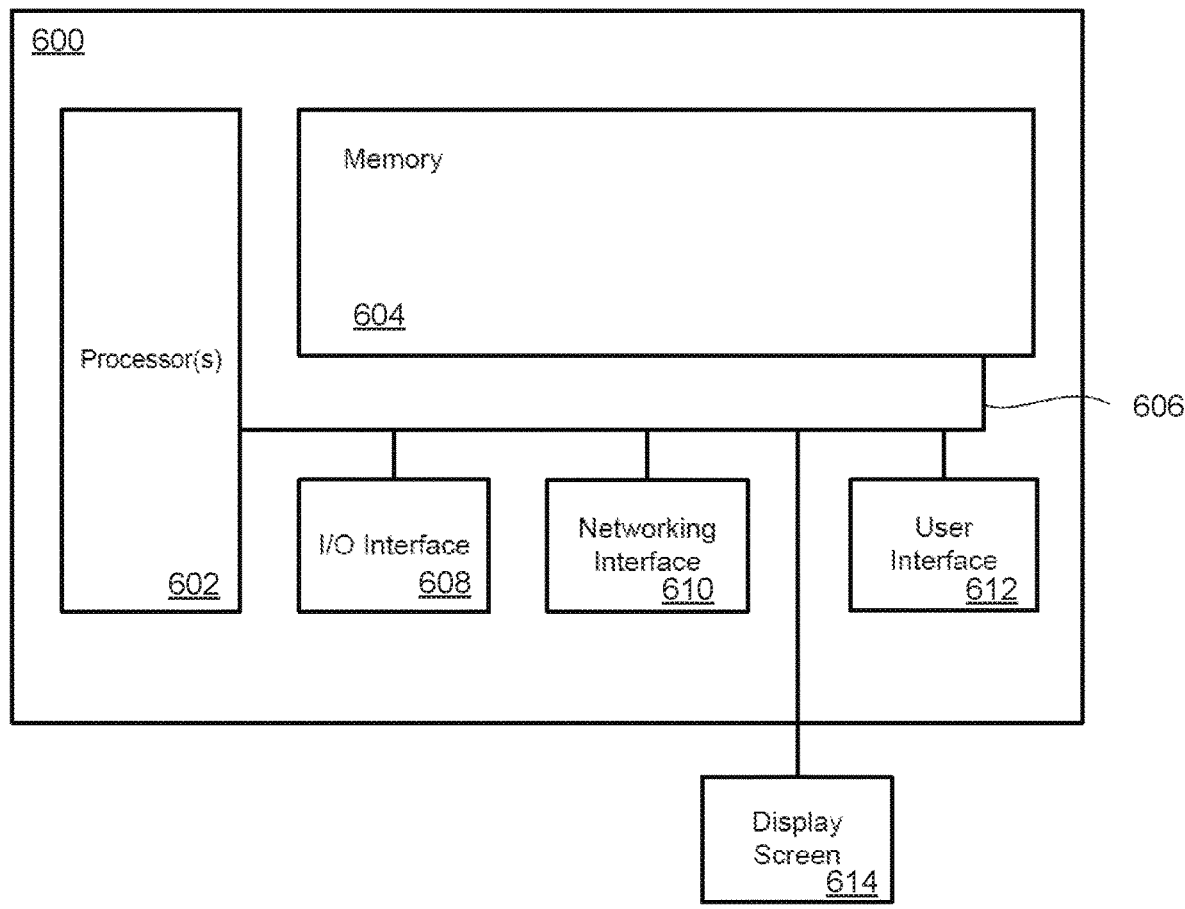
FIG. 6 is a block diagram of an example computer system with an electronic device package in accordance with another example embodiment.

FIG. 6 depicts an exemplary system upon which embodiments of the present disclosure may be implemented. For example, the system of FIG. 6 may be a computer system at a remote location that receives communication signals from a communication device associated with the flowmeter monitor. Components of the system of FIG. 6 may be used for the virtual reality simulation. For example, the processor 110 of FIG. 1C, the processor associated with the wearable object 106 of FIG. 1A, or the processor associated with the systems of the physical object of FIG. 1C may be the same as processor 602. The system can include a memory controller 602, a plurality of memory 604, a processor 606, and circuitry 608. Various embodiments of such systems for FIG. 6 can include smart phones, laptop computers, handheld and tablet devices, CPU systems, SoC systems, server systems, networking systems, storage systems, high capacity memory systems, or any other computational system.

The system can also include an I/O (input/output) interface 610 for controlling the I/O functions of the system, as well as for I/O connectivity to devices outside of the system. A network interface can also be included for network connectivity, either as a separate interface or as part of the I/O interface 610. The network interface can control network communications both within the system and outside of the system. The network interface can include a wired interface, a wireless interface, a Bluetooth interface, optical interface, and the like, including appropriate combinations thereof. Furthermore, the system can additionally include various user interfaces, display devices, as well as various other components that would be beneficial for such a system.

The system can also include memory in addition to memory 604 that can include any device, combination of devices, circuitry, and the like that is capable of storing, accessing, organizing and/or retrieving data. Non-limiting examples include SANs (Storage Area Network), cloud storage networks, volatile or non-volatile RAM, phase change memory, optical media, hard-drive type media, and the like, including combinations thereof.

The processor 606 can be a single or multiple processors, and the memory can be a single or multiple memories. The local communication interface can be used as a pathway to facilitate communication between any of a single processor, multiple processors, a single memory, multiple memories, the various interfaces, and the like, in any useful combination.

The system can also include a user interface 612 a graphical user interface for interacting with the user. The system can also include a display screen 614 for displaying images and the user interface 612.

The disclosed embodiments may be implemented, in some cases, in hardware, firmware, software, or any combination thereof. Portions of the disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

EXAMPLES

The following examples pertain to specific technology embodiments and point out specific features, elements, or steps that may be used or otherwise combined in achieving such embodiments.

In one example there is provided a device for providing haptic feedback, comprising: a physical object with a surface for a user to interact with during executing of a virtual reality simulation wherein the physical object represents an object in the virtual reality simulation; and a mechanism configured to change a shape or size of the surface of the physical object in response to a change in the virtual reality simulation.

In one example of a device for providing haptic feedback comprises, a tracking system in communication with the virtual reality simulation configured to detect the change made in the virtual reality simulation.

In one example of a device for providing haptic feedback comprises, the tracking system receives information from a camera coupled to a head-mounted display associated with the user.

In one example of a device for providing haptic feedback comprises, a location system configured to detect a location of the physical object within a room that the user is located in.

In one example of a device for providing haptic feedback comprises, a mobility system to configured move the physical object to a new location within a room in response to the change in the virtual reality simulation.

In one example of a device for providing haptic feedback comprises, the change made in the virtual reality simulation is made by the user.

In one example of a device for providing haptic feedback comprises, a second surface coupled to the physical object and configured to telescope out of or retract into a housing of the physical object.

In one example of a device for providing haptic feedback comprises, the mechanism moves the second surface to be uniform with the surface of the physical object after the second surface has telescoped out of the housing.

In one example of a device for providing haptic feedback comprises, a second surface coupled to the surface of the physical object via a hinge and configured to fold to a new position via the mechanism in response to the change in the virtual reality simulation.

In one example of a device for providing haptic feedback comprises, the physical object represents a wall in the virtual reality simulation and the change in the virtual reality simulation results in the wall changing heights.

In one example of a device for providing haptic feedback comprises, the physical object has a shape that is deformable in response to the change in the virtual reality simulation and the shape is selected from the group of shapes consisting of: a two dimensional rectangle, a three dimensional box, a cylinder, and a torus.

In one example of a device for providing haptic feedback comprises, the physical object interacts with the user during the virtual reality simulation to provide passive haptic feedback.

In one example of a device for providing haptic feedback comprises, a plurality of objects configured to form the surface of the physical object; and a plurality of mechanisms configured to move the plurality of objects relative to one another such that the surface of the physical object is a deformable surface.

In one example of a device for providing haptic feedback comprises, the deformable surface provides texture to the physical object.

In one example of a device for providing haptic feedback comprises, the plurality of the physical objects are deformable to give shape to a button that represents a virtual button in the virtual reality simulation and when the button is physically pressed by the user a change is made in the virtual reality simulation.

In one example of a device for providing haptic feedback comprises, the plurality of the physical objects are deformable to give shape to a plurality of physical shapes that represents a virtual user interface in the virtual reality simulation that trigger feedback in the virtual reality simulation when one of the plurality of shapes is pressed by the user.

In one example there is provided a system for providing haptic feedback, comprising: a processor configured to execute a virtual reality simulation; a wearable component configured to provide visual stimuli to a user for the virtual reality simulation; a physical room configured to house the user during use of the virtual reality simulation; a physical object in the physical room with a surface for the user to interact with during the use of the virtual reality simulation wherein the physical object represents an object in the virtual reality simulation; and a mechanism configured to change a shape or size of the surface of the physical object in response to a change in the virtual reality simulation.

In one example of a system for providing haptic feedback comprises, a tracking system in communication with the virtual reality simulation configured to detect the change made in the virtual reality simulation.

In one example of a system for providing haptic feedback comprises, the tracking system receives information from a camera coupled to the wearable component.

In one example of a system for providing haptic feedback comprises, a location system configured to detect a location of the physical object within a room that the user is located in.

In one example of a system for providing haptic feedback comprises, a mobility system to configured move the physical object to a new location within a room in response to the change in the virtual reality simulation.

In one example of a system for providing haptic feedback comprises, the change made in the virtual reality simulation is made by the user.

In one example of a system for providing haptic feedback comprises, a second surface coupled to the physical object and configured to telescope out of or retract into a housing of the physical object.

In one example of a system for providing haptic feedback comprises, the mechanism moves the second surface to be uniform with the surface of the physical object after the second surface has telescoped out of the housing.

In one example of a system for providing haptic feedback comprises, a second surface coupled to the surface of the physical object via a hinge and configured to fold to a new position via the mechanism in response to the change in the virtual reality simulation.

In one example of a system for providing haptic feedback comprises, the physical object represents a wall in the virtual reality simulation and the change in the virtual reality simulation results in the wall changing heights.

In one example of a system for providing haptic feedback comprises, the physical object has a shape that is deformable in response to the change in the virtual reality simulation and the shape is selected from the group of shapes consisting of: a two dimensional rectangle, a three dimensional box, a cylinder, and a torus.

In one example of a system for providing haptic feedback comprises, the physical object interacts with the user during the virtual reality simulation to provide passive haptic feedback.

In one example of a system for providing haptic feedback comprises, a plurality of objects configured to form the surface of the physical object; and a plurality of mechanisms configured to move the plurality of objects relative to one another such that the surface of the physical object is a deformable surface.

In one example of a system for providing haptic feedback comprises, the deformable surface provides texture to the physical object.

In one example of a system for providing haptic feedback comprises, the plurality of the physical objects are deformable to give shape to a button that represents a virtual button in the virtual reality simulation and when the button is physically pressed by the user a change is made in the virtual reality simulation.

In one example of a system for providing haptic feedback comprises, the plurality of the physical objects are deformable to give shape to a plurality of physical shapes that represents a virtual user interface in the virtual reality simulation that trigger feedback in the virtual reality simulation when one of the plurality of shapes is pressed by the user.

In one example of a system for providing haptic feedback comprises, the wearable object is a head-mounted display.

In one example there is provided a method for providing haptic feedback, comprising: providing a virtual reality simulation via a processor and a wearable component to a user; providing passive haptic feedback to the user via a physical object wherein the physical object represents a virtual object in the virtual reality simulation; tracking a change in virtual reality simulation; and changing a shape or size of the physical object in response to the change.

In one example of a method for providing haptic feedback, changing a location of the physical object within a room in response to the change.

In one example of a method for providing haptic feedback, the change is a change made to the virtual object in the virtual reality simulation.

In one example of a method for providing haptic feedback, the change is detected the virtual object is no longer part of the virtual reality simulation and the physical object represents a second virtual object in the virtual reality simulation after the change is made to the physical object.

In one example of a method for providing haptic feedback, the changing of the physical object telescopes a second surface out of a housing of the physical objects.

In one example of a method for providing haptic feedback, the changing of the physical object folds a surface of the physical object via a hinge to a new position.

In one example of a method for providing haptic feedback, the changing of the physical object changes a plurality of objects that are configured to form a surface of the physical object by moving the plurality of objects relative to one another.

In one example of a method for providing haptic feedback, the plurality of the physical objects are deformable to give shape to a button that represents a virtual button in the virtual reality simulation and when the button is physically pressed by the user a change is made in the virtual reality simulation.

In one example of a method for providing haptic feedback, the plurality of the physical objects are deformable to give shape to a plurality of physical shapes that represents a virtual user interface in the virtual reality simulation that trigger feedback in the virtual reality simulation when one of the plurality of shapes is pressed by the user.

In one example there is provided a system for arraigning rooms, comprising: a processor configured to execute a virtual reality simulation; a wearable component configured to provide visual stimuli to a user for the virtual reality simulation; a tracking component to track changes made within the virtual reality simulation; a first physical room configured to house the user during use of the virtual reality simulation; a second physical room adjacent to a first wall of the first physical room; and a mechanism to move the second physical room to be adjacent to a second wall of the first physical room based on a change made in the virtual reality simulation.

In one example of a system for arraigning rooms comprises, a physical object in the first physical room with a surface for the user to interact with during the use of the virtual reality simulation wherein the physical object represents an object in the virtual reality simulation; and a mechanism configured to change a shape or size of the surface of the physical object in response to a change in the virtual reality simulation.

In one example of a system for arraigning rooms comprises, the first physical room and the second physical room each comprise four walls with a passageway in each wall.

In one example of a system for arraigning rooms comprises, the tracking component anticipate that the user is about to pass through a first passageway in the first physical room based on actions taken in the virtual reality simulation and controls the mechanism to move the second physical room to be adjacent to the first passageway in the first physical room.

In one example of a system for arraigning rooms comprises, passageways in the first physical room have a door that is unable to open until the mechanism moves the second physical room adjacent to a given passageway.

In one example of a system for arraigning rooms comprises, a series of tracks that the first physical room and the second physical room are able to move upon and rotate upon via the mechanism.

In one example there is provided a device for providing haptic feedback, comprising: a plurality of physical objects configured to provide a deformable surface for a user to interact with during executing of a virtual reality simulation wherein the surface represents an object in the virtual reality simulation; and a plurality of mechanisms configured to move the plurality of physical objects relative to one another to change the deformable surface in response to a change in the virtual reality simulation.

In one example of a device for providing haptic feedback comprises, the plurality of physical objects are cylindrical in shape and can protrude from a housing surface at different lengths from one another via the plurality of mechanisms.

In one example of a device for providing haptic feedback comprises, the deformable surface provides texture to for passive haptic feedback for the user.

In one example of a device for providing haptic feedback comprises, the plurality of the physical objects are deformable to give shape to a button that represents a virtual button in the virtual reality simulation and when the button is physically pressed by the user a change is made in the virtual reality simulation.

In one example of a device for providing haptic feedback comprises, the plurality of the physical objects are deformable to give shape to a plurality of physical shapes that represents a virtual user interface in the virtual reality simulation that trigger feedback in the virtual reality simulation when one of the plurality of shapes is pressed by the user.

In one example of a device for providing haptic feedback comprises, the plurality of mechanisms are further configured to provide dampening and cushioning to the plurality of physical objects when the plurality of physical objects are depressed.

In one example of a device for providing haptic feedback comprises, a tracking system in communication with the virtual reality simulation configured to detect the change made in the virtual reality simulation.

In one example of a device for providing haptic feedback comprises, the tracking system receives information from a camera coupled to a head-mounted display associated with the user.

In one example of a device for providing haptic feedback comprises, the change made in the virtual reality simulation is made by the user.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. A device for providing haptic feedback, comprising:
    a physical object with a surface for a user to interact with during execution of a virtual reality simulation, the physical object representing an object in the virtual reality simulation, the surface to be touched by the user during user interaction, the physical object including:
        an outer portion;
        a first inner portion extendable from the outer portion;
        a second inner portion extendable from the first inner portion, the first inner portion extendable in a first direction, the second inner portion extendable in a second direction, the second direction different than the first direction; and
        a mechanism to change at least one of a shape or a size of the surface of the physical object by extending or retracting at least one of the first inner portion or the second inner portion in response to a change in the virtual reality simulation; and
    a mobility system to move the physical object from a first location to a second location via steerable wheels in response to the change in the virtual reality simulation.

2. The device of claim 1, further including a tracking system in communication with the virtual reality simulation, the tracking system to detect the change made in the virtual reality simulation.

3. The device of claim 1, further including a location system to detect the first location and the second location.

4. The device of claim 1, wherein the mobility system further includes collision avoidance technology to avoid collision by steering the physical object around other objects.

5. The device of claim 1, wherein the surface is a first surface, the device further including a second surface coupled to the physical object, the second surface to telescope out of or retract into a housing of the physical object.

6. The device of claim 1, wherein the surface is a first surface, the device further including a second surface coupled to the first surface of the physical object via a hinge and foldable via the mechanism in response to the change in the virtual reality simulation.

7. The device of claim 1, wherein the physical object is to interact with the user during the virtual reality simulation to provide passive haptic feedback.

8. The device of claim 1, wherein the mechanism is a first mechanism, the device further including:
    a plurality of objects to form the surface of the physical object; and
    a plurality of second mechanisms to move the plurality of objects relative to one another such that the surface of the physical object is a deformable surface.

9. The device of claim 8, wherein the deformable surface provides texture to the physical object.

10. The device of claim 8, wherein the plurality of the physical objects are deformable to give shape to a button that represents a virtual button in the virtual reality simulation and when the button is physically pressed by the user a change is made in the virtual reality simulation.

11. The device of claim 8, wherein the plurality of the physical objects are deformable to give shape to a plurality of physical shapes that represents a virtual user interface in the virtual reality simulation that trigger feedback in the virtual reality simulation when one of the plurality of shapes is pressed by the user.

12. A system for providing haptic feedback, comprising:
    a processor to execute a virtual reality simulation;
        a wearable component to provide visual stimuli to a user for the virtual reality simulation;
        a physical object with a surface for the user to interact with during the use of the virtual reality simulation wherein the physical object represents an object in the virtual reality simulation, the surface to be touched by the user during user interaction, the physical object including: an outer portion;
        a first inner portion extendable from the outer portion; a second inner portion extendable from the first inner portion, the first inner portion extendable in a first direction, the second inner portion extendable in a second direction, the second direction different than the first direction; and
        a mechanism to change at least one of a shape or a size of the surface of the physical object by extending or retracting at least one of the first inner portion or the second inner portion in response to a change in the virtual reality simulation; and a mobility system to move the physical object between a first location and a second location via steerable wheels in response to the change in the virtual reality simulation.

13. The system of claim 12, further including a tracking system in communication with the virtual reality simulation, the tracking system to detect the change made in the virtual reality simulation.

14. The system of claim 12, further including a location system to detect the first location and the second location.

15. The system of claim 12, wherein the mobility system further includes collision avoidance technology to avoid collision to by steering the physical object around other objects.

16. The system of claim 12, wherein the surface is a first surface, the physical object further including a second surface to telescope out of or retract into the outer portion of the physical object.

17. The system of claim 12, wherein the surface is a first surface, the physical object further including a second surface coupled to the surface of the physical object via a hinge and foldable via the mechanism in response to the change in the virtual reality simulation.

18. The system of claim 12, wherein the mechanism is a first mechanism, the system further including:
- a plurality of objects to form the surface of the physical object; and
- a plurality of second mechanisms to move the plurality of objects relative to one another such that the surface of the physical object is a deformable surface.

19. A device for providing haptic feedback, comprising:
- a plurality of physical objects configured to provide a deformable surface for a user to interact with during execution of a virtual reality simulation wherein the surface represents an object in the virtual reality simulation; and
- a plurality of mechanisms configured to move the plurality of physical objects relative to one another to change the deformable surface in response to a change in the virtual reality simulation.

20. The device of claim 19, wherein the plurality of physical objects are cylindrical in shape and can protrude from a housing surface at different lengths from one another via the plurality of mechanisms.

21. The device of claim 19, wherein the deformable surface provides texture to for passive haptic feedback for the user.

22. The device of claim 19, wherein the plurality of the physical objects are deformable to give shape to a button that represents a virtual button in the virtual reality simulation and when the button is physically pressed by the user a change is made in the virtual reality simulation.

23. The device of claim 19 wherein the plurality of the physical objects are deformable to give shape to a plurality of physical shapes that represents a virtual user interface in the virtual reality simulation that trigger feedback in the virtual reality simulation when one of the plurality of shapes is pressed by the user.

24. The device of claim 19 wherein the plurality of mechanisms are further configured to provide dampening and cushioning to the plurality of physical objects when the plurality of physical objects are depressed.

25. The device of claim 19, further comprising:
- a tracking system in communication with the virtual reality simulation configured to detect the change made in the virtual reality simulation.

26. The device of claim 25, wherein the tracking system receives information from a camera coupled to a head-mounted display associated with the user.

27. The device of claim 19, wherein the change made in the virtual reality simulation is made by the user.

* * * * *